United States Patent [19]

Kao

[11] Patent Number: 4,714,616

[45] Date of Patent: Dec. 22, 1987

[54] PREPARING NATURALLY SWEET YOGURT WITH SACCHAROMYCOPSIS SP. AND RHIZOPUS SPP.

[76] Inventor: Anthony H. Kao, 91 Lawai Street, Honolulu, Hi. 96825

[21] Appl. No.: 913,561

[22] Filed: Sep. 29, 1986

Related U.S. Application Data

[63] Continuation of Ser. No. 620,323, Jun. 12, 1984, abandoned.

[51] Int. Cl.⁴ .......................... A23C 9/12; A23L 1/20; C12G 1/00
[52] U.S. Cl. ....................................... 426/42; 426/15; 426/43; 426/46
[58] Field of Search ....................... 426/11, 15, 13, 35, 426/42, 43, 44, 46

[56] References Cited

U.S. PATENT DOCUMENTS

| | | | |
|---|---|---|---|
| 327,636 | 10/1895 | Woodruff | 426/42 |
| 2,824,804 | 2/1958 | Mishima | 426/43 |
| 3,563,760 | 2/1971 | Kuwabara et al. | 426/43 |
| 3,753,724 | 8/1973 | Silby | 99/30 |
| 3,764,710 | 10/1973 | Inagami et al. | 426/185 |
| 3,950,544 | 4/1976 | Fridman | 426/43 |

OTHER PUBLICATIONS

Economic Microbiology, vol. 7, Fermented Foods, Academic Press, N.Y., 1982, pp. 27–38.
Webb et al., Byproducts from Milk, 2nd ed., The Air Publ. Co. Inc., Westport, Conn. 1970, pp. 37–42.

*Primary Examiner*—David M. Naff
*Attorney, Agent, or Firm*—Cushman, Darby & Cushman

[57] ABSTRACT

A naturally sweet yogurt-type product is prepared from a dairy or soy-based milk product using rice wine containing active cultures of Saccharomycopsis sp. and Rhizopus spp. as the yogurt-producing microorganisms. The cultured product is pasteurized, refrigerated and is enjoyable as a food product for its natural sweet, bland taste.

9 Claims, No Drawings

PREPARING NATURALLY SWEET YOGURT WITH SACCHAROMYCOPSIS SP. AND RHIZOPUS SPP.

This is a continuation of application Ser. No. 620,323, filed June 12, 1984, which was abandoned upon the filing hereof.

This invention relates to the preparation of yogurt and more particularly to the preparation of yogurt using a specially prepared rice wine as the medium for the yogurt-producing microorganisms.

BACKGROUND OF THE INVENTION

Conventional yogurt making includes sterilizing whole, low fat or fat-enriched milk to kill any wild microorganisms that may be present followed by cooling then innoculation with a yogurt culture, typically *Lactobacillus bulgaricus,* which develops the aroma, and *Streptococcus thermophilus,* which develops the required degree of acidity. The incubated milk is then maintained in a water bath or cooking vessel for 2½ to 3 hours or so at about 42° C. to 45° C. until the desired yogurt flavor intensity is developed, then the yogurt is stored under refrigeration.

Various varieties of such conventionally produced yogurt are presently available on the market and are all characterized by a somewhat sour, sharp taste. Indeed, one of the objects of the conventional yogurt making process is to develop an acid character in the yogurt product. While the characteristic sour, sharp taste is considered indicative of yogurt, many potential consumers of yogurt or yogurt-type products—who could well benefit from yogurt's excellent healthful properties—find the sour, sharp taste to be objectionable. In some instances individuals are coaxed to tolerate the otherwise objectional yogurt-like taste for the medical benefits that have been allegedly attributed to yogurt. In order to widen the public's acceptance of yogurt, yogurt manufacturers have often added sweetened fruit or flavorings to the yogurt itself, either suspended in the yogurt or at the bottom of the container for dispersion in the yogurt at the time of consumption. Such flavorings are primarily an effort to disguise the sourness and sharpness of the product and, while accomplishing the results desired, also have the unwanted consequence of increasing the caloric value of the product thereby detracting from its virtue as a diet food.

The yogurt product of my invention does not require the addition of sugary, taste-altering and calorie-increasing additives, is well accepted and indeed preferred by consumers but it also provides a unique tasting product.

DETAILED DESCRIPTION OF THE INVENTION

The unique yogurt product of my invention is prepared based upon dairy milk, other milk of animal origin, or vegetable-based milk, for instance soy milk. The milk source, be it animal or vegetable, is heated for pasteurization in order to kill any wild strains of microorganism present in the milk, then homogenized to assure uniform dispersion of the fat particles in the milk.

The yogurt-producing microorganisms are contained in a specially prepared rice wine which is derived from the fermentation of rice using specific microorganisms as identified below. The rice wine and the homogenized and heated milk source are mixed together in appropriate quantities and allowed to incubate for the requisite period of time, or at least until the milk is coagulated. If desired, one may add sucrose, honey, corn syrup or other sweetening agents to the yogurt product either before incubation or after the incubation is complete. Similarly, fruit additives such as fruit puree, minced or chopped fruit, preserves or the like may be added to the yogurt either prior to incubation or at the completion of incubation.

Incubation typically occurs at about 43° C. (110° F.) for a period of 3 to 4 hours, however different temperatures and incubation times may be used depending on the operator and the taste preference of the consumer. Complete incubation is evidenced by coagulation of the milk. The finished product may be pasteurized for a period of 30 minutes at a temperature of from 63°–74° C. (145°–165° F.), or using any time/temperature combination suitable to achieve the required pasteurization. The final product is stored under refrigeration, typically at about 5° C. (41° F.), and has a shelf life of the order of about 3 to 4 weeks.

When soy milk is used as the milk base for the yogurt-like product of my invention, the resulting product has a custard-like texture and is free from cholesterol, a distinct advantage in comparison with dairy-based yogurt. It is also possible to mix various proportions of dairy-based milk and soy milk to achieve any degree of flavor combination or butter fat content as may be desired. Additional flavorings, colorings, stabilizers, shelf-life extender or food additives may be included but are not normally needed hence not recommended.

Unique to the process of my invention is the use of a specially prepared wine which is made from cooked rice to which has been added a culture consisting of a mixture of Saccharomycopsis sp. and Rhizopus spp. It is believed that this specially prepared rice wine, with its live, active cultures, is responsible not only for the unique sweet flavor of the product but also the consistency and mouth feel of the resulting yogurt product.

Preparation of Rice Wine

The rice wine used as the microorganism-containing medium for the process of my invention is prepared as follows: Rice is heated in a closed container with steam until it is completely cooked, usually about 40–50 minutes. The cooked rice is then cooled to about 43° C. (110° F.). Next, a starting culture of Saccharomycopsis sp. and Rhizopus spp. are added to warm water at 43° C. (110° F.) and thoroughly mixed and the resulting aqueous culture suspension is then mixed with and distributed throughout the cooked rice. The ratio of starting culture to rice is in the range 0.0002 to 0.0015 parts of culture to 1 part of rice, calculated on the dry weight basis. Additional warm water is added to the culture-containing cooked rice to make a final ratio of 5 parts rice to 1 part water, again based upon weight.

The mixture of rice and culture is packed into a suitable airtight container with sufficient room at the top of the container for expansion of the gases from the fermenting mass. The container is then sealed and allowed to incubate at about 43° C. (110° F.) for a period of from 24 to 48 hours or until a wine is produced having the proper taste. At the completion of fermention, solids are removed from the fermented mass leaving liquid wine which is bottled and retained under refrigerated conditions at about 5° C. (41° F.).

My invention will now be further explained with reference to the following examples, in which all parts and percentages are by weight and temperatures reported in degree centigrade unless otherwise indicated.

EXAMPLES OF THE INVENTION

Wine preparation

Using a stainless steel mixing bowl, the following ingredients, measured in dry weight, were mixed manually:

1 pound (453.59 grams) of steamed glutinous rice, cooled to room temperature at 24° C. (75° F.)

0.01 oz. of starting culture (Saccharomycopsis sp and Rhizopus spp.) dispersed in ¾ quart (0.7 liter) of warm water (at 43° C./110° F.).

The cultured rice was subsequently divided into 3 lots and packed into 3 glazed ceramic jars with lids, leaving in each jar an empty space roughly 1.5 inches (3.8 cm.) deep at the top to allow expansion of the fermenting mash. The jars were placed inside an oven and the oven temperature was maintained at 43° C. (110° F.) over a 24-hour period.

24 hours later, wine was poured out from the jars. Subsequent harvests of wine were made at 24-hour intervals. Finally, the residual solids were separated from wine by filtering. The wine was bottled and stored under refrigeration at 5° C. (41° F.).

EXAMPLE 1

Milk preparation: Into 1 gallon of fresh, whole milk was blended 2 pints of "half & half" cream/milk and 3.44 ounces (97.5 grams) of dehydrated low-fat milk powder. While stirring manually, the mixture was heated to a boil over a period of about 45 minutes, until the temperature reached 93° C. (200° F.). The heated milk was immediately passed through an homogenizer twice; first at 3,500 psi and the second pass at 500 psi pressure. With the aid of crushed ice mixed in tap water surrounding the container, the temperature of the milk was lowered to 43° C. (110° F.) in about 7 minutes.

Yogurt preparation: 8.75 fluid ounces (0.26 liter) of the thus-prepared milk was used. Into the milk, 1.25 fl. oz. (0.037 liter) of rice wine prepared as described above was added. The mixture was manually blended.

Meanwhile, temperature in an oven was stabilized at about 43° C. (110° F.). Into the oven, 2 ceramic dishes containing equal portions of the cultured milk were placed. 3 hours later, the milk in the oven was visually observed to have coagulated, whereupon the oven temperature was raised to 63° C. (145° F.). Thirty (30) minutes later, the dishes were removed from the oven and covered. Approximately 15 minutes later, when cooled off a little, they were transferred into a refrigerator at 5° C. (41° F.).

The chilled samples of yogurt-like product were taste-tested 24 hours later and were found to have a unique, subtle flavor and aroma all its own with a creamy texture and a faintly sweet but essentially bland taste.

EXAMPLE 2

Example 1 was repeated on the same day. This time the yogurt was sweetened with 1.5 teaspoons of table sugar and flavored with 20 drops of fresh lemon juice. These ingredients were added to the prepared milk almost simultaneously with the wine. The resulting product had a most acceptable, sweet taste.

EXAMPLE 3

One gallon (3.7854 liters) of fresh soy bean milk, obtained from a commercial tofu factory, was heated for about 45 minutes to 93° C. (200° F.) then homogenized twice, first at 3,500 psi and then at 500 psi. Using an equal quantity of soy milk and the same procedure as adopted in Example 1, a yogurt-like product was produced. The consistency of the curd was somewhat thicker than with a dairy-based yogurt indicating possibly a higher solids content. The texture of the soy milk-based yogurt was similar to that of dairy cream, having a unique mouth feel and a soymilk taste. The after-taste was similar to that of the dairy-based yogurt produced in Example 1.

I claim:

1. A process for preparing a yogurt product having a bland, unique, sweet taste, said process comprising the successive steps of:
   (a) heating dairy or a vegetable-based milk to a temperature sufficient to sterilize the milk;
   (b) homogenizing the sterilized milk to uniformly distribute the fat particles therein;
   (c) innoculating the homogenized milk of step (b) wiht an innoculant consisting essentially of rice wine containing a milk coagulating amount of Saccharomycopsis sp. and Rhizopus spp. and allowing the culture to grow until the milk is coagulated;
   (d) pasteurizing the milk coagulum of step (c); and
   (e) cooling the pasteurized milk coagulum to yield a bland, sweet-tasting yogurt product.

2. The process of claim 1 in which the milk is sterilized in step (a) by heating to a temperature of about 90° C. to about 100° C. over a period of about 15 to about 60 minutes.

3. The process of claim 1 in which the innoculated milk is incubated at a temperature of about 40° C. to about 50° C. for a period of from about 2 to about 5 hours.

4. The process of claim 3 in which the innoculated milk is incubated at a temperature of about 45° C. for a period of from about 3 to about 4 hours.

5. The process of claim 1 in which the pasteurization is for a period of about 30 minutes at a temperature of about 63° C. to about 74° C.

6. The process of claim 1 in which the milk is cow's milk, low fat cow's milk or low fat cow's milk fortified with nonfat dry milk.

7. The process of claim 1 in which the milk is soy milk.

8. A yogurt product produced by the process of claim 6.

9. A yogurt product produced by the process of claim 7.

* * * * *